United States Patent [19]

King

[11] Patent Number: 4,656,658

[45] Date of Patent: Apr. 7, 1987

[54] NETWORK ROUTING ARRANGEMENT

[75] Inventor: Gary S. King, Thornton, Colo.

[73] Assignees: American Telephone and Telegraph Company, New York, N.Y.; AT&T Information Systems Inc., Morristown, N.J.

[21] Appl. No.: 786,741

[22] Filed: Oct. 11, 1985

[51] Int. Cl.⁴ .............................................. H04M 7/00
[52] U.S. Cl. ..................................... 379/221; 379/243
[58] Field of Search ............... 179/18 D, 18 EA, 8 A, 179/9, 10

[56] References Cited

U.S. PATENT DOCUMENTS

| | | | |
|---|---|---|---|
| 3,560,663 | 2/1971 | Lee et al. | 179/18 |
| 3,705,523 | 12/1972 | Alouisa | 179/18 EA |
| 3,906,164 | 9/1975 | Philip et al. | 179/18 EA |
| 4,049,906 | 9/1977 | Hafner et al. | 178/2 C |
| 4,081,612 | 3/1978 | Hafner | 179/15 BA |
| 4,345,116 | 8/1982 | Ash et al. | 179/18 EA |
| 4,380,063 | 4/1983 | Janson et al. | 370/60 |

OTHER PUBLICATIONS

Defense Communications Agency, Washington DC, DCA Circular 370-V120-1, Feb. 27, 1981.
"Analysis of Flow-Controls in Switched Data Network by a Unified Model", G. Pujolle, Institut de Recherche d'Informatique et d'Atomatique (IRIA) Laboria, 78150 LeChesnay, France, pp. 123-128.
"Methods, Tools, and Observations on Flow Control in Packet-Switched Data Networks, IEEE 1981, by Louis Pouzin, pp. 413-426.

Primary Examiner—James L. Dwyer
Attorney, Agent, or Firm—Frederick B. Luludis

[57] ABSTRACT

Circular paths in a multinode connection are avoided by passing an adaptive routing state, from node to node, which specifies the path options that the current node may use in its selection of a next step in the connection. The routing state, which is characterized by, for example, a single digit, is updated by the current node and is a function of the recent path history of the connection. The single-digit routing state controls the advancement of the connection by specifying whether the next selected step can be either a forward step, a null step or a backward step, or any combination thereof. A forward step advances the connection toward its destination, a null step does not advance the connection and a backward step causes the connection to step backward to a node not yet in the connected path. When a node selects a next step, it adapts the routing state digit to reflect its selection and passes the new routing state digit to the next node.

11 Claims, 7 Drawing Figures

FIG. 2

TABLE 1

| ROUTING STATE | PATH HISTORIES |
|---|---|
| 0 | (1,1,1) (1,1,0) |
| 1 | (1,1,-1) (1,0,1) (1,0,0) |
| 2 | (0,1,1) (0,1,0) |
| 3 | (1,-1,1) (0,0,1) |
| 4 | (-1,1,1) |

FIG. 3

TABLE 2

| | | ADVANCE OF NEXT STEP | | |
|---|---|---|---|---|
| | | FORWARD | NULL | BACKWARD |
| | | +1 | 0 | -1 |
| CURRENT ROUTING STATE | 0 | 0 | 2 | 4 |
| | 1 | 0 | 2 | X |
| | 2 | 1 | 3 | X |
| | 3 | 1 | X | X |
| | 4 | 3 | X | X |
| | 5 | 5 | 6 | X |
| | 6 | 5 | X | X |
| | 7 | 7 | X | X |

FIG. 6

NODE B PATH SELECTION MAP 600

| NODE | S | STEP | STEP STATUS | ADVANCE | STEP | STEP STATUS | ADVANCE | STEP | STEP STATUS | ADVANCE | STEP | STEP STATUS | ADVANCE | STEP | STEP STATUS | ADVANCE |
|------|---|------|-------------|---------|------|-------------|---------|------|-------------|---------|------|-------------|---------|------|-------------|---------|
| A | 1 | 401 | 1 | +1 | 406 | 0 | 0 | 407 | 0 | 0 | 404 | 1 | -1 | 405 | 0 | -1 |
| C | 1 | 404 | 0 | +1 | 405 | 1 | 0 | 406 | 0 | 0 | 401 | 1 | -1 | 407 | 0 | -1 |
| D | 0 | 407 | 0 | +1 | 401 | 1 | 0 | 406 | 0 | 0 | 404 | 1 | -1 | 405 | 0 | -1 |
| E | 0 | 406 | 0 | +1 | 401 | 1 | 0 | 404 | 0 | 0 | 405 | 0 | 0 | 407 | 0 | 0 |
| F | 1 | 405 | 0 | +1 | 404 | 1 | 0 | 406 | 0 | 0 | 401 | 1 | -1 | 407 | 0 | -1 |
| G | 1 | 406 | 0 | +1 | 407 | 0 | +1 | 401 | 1 | 0 | 404 | 1 | 0 | 405 | 0 | 0 |
| H | 1 | 405 | 0 | +1 | 406 | 0 | +1 | 407 | 0 | +1 | 401 | 1 | 0 | 404 | 1 | 0 |
| I | 1 | 405 | 0 | +1 | 406 | 0 | +1 | 401 | 1 | 0 | 404 | 1 | 0 | 407 | 0 | 0 |

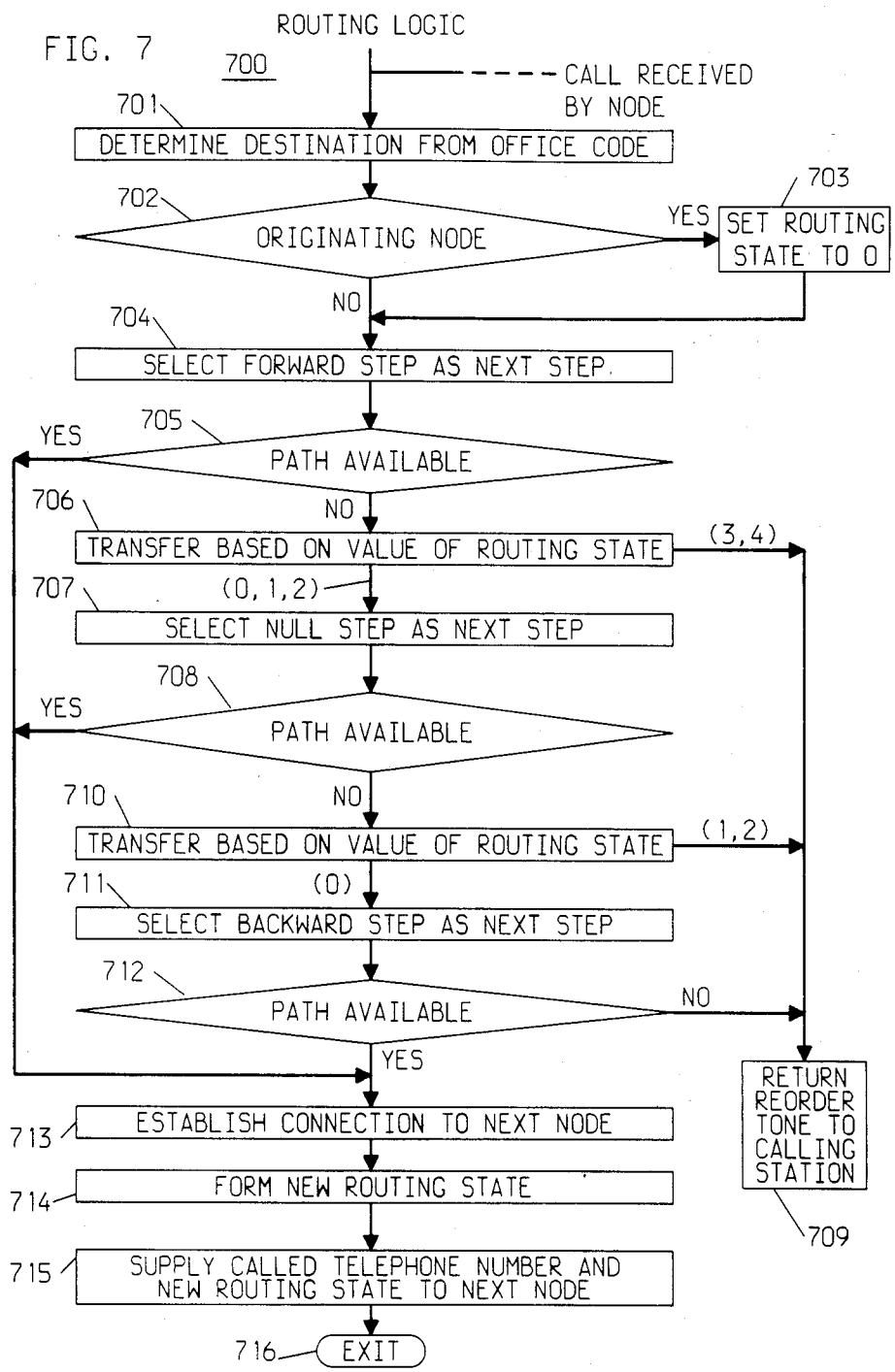

NETWORK ROUTING ARRANGEMENT

TECHNICAL FIELD

This invention relates to an arrangement for routing calls and, more particularly, to an adaptive non-hierarchical call routing arrangement.

BACKGROUND OF THE INVENTION

In a system for routing traffic, for example, in a telecommunication system for routing a call to interconnect a calling station with a called station, it occasionally happens that the connection is blocked. Reasons for blocking include the unavailability of a path between the calling station and called station, for example, stemming from an all-trunks-busy condition. To lessen the blocking of a call, the system may provide alternate routes between the calling station, or originating node, and the called station, or terminating node. Indeed, alternate routing has come to be the technique that is employed routinely by telecommunication systems to lessen the chance that a call will be blocked because of the unavailability of a trunk, or path.

In providing alternate routing, a telecommunication system comprised of a plurality of nodes needs to ensure that a circular path, in which the call is routed through the same node two or more times, does not occur. It is clear that the establishment of a circular path is an inefficient use of switching equipment, since an incoming and an outgoing trunk are made busy each time a call passes through a node. Consequently, circular paths needlessly decrease the availability of trunks and therefore increase the chance that other circular paths are established.

One solution to this problem predetermines the path of a call at the originating node before the connection is actually established. For example, in U.S. Pat. No. 4,345,116 to G. R. Ash et al there is disclosed a routing arrangement for routing traffic through the public switched network. In this arrangement, the preferred route of a call is predetermined at the originating switching center before it is actually established. However, this arrangement is inefficient since it is not known at the originating switching center whether a blocking condition exists at some point along the predetermined route before the route is established. Consequently, when a blocking condition is encountered, the originating switching center tears down the uncompleted connection and reroutes the call over an alternate route, starting once again from the originating switching center.

Private communication networks, which typically comprise a plurality of interconnected PBXs, or nodes, avoid establishing a circular path in a multinode connection by limiting alternate route selection to the originating node of a call. Each node in such networks is typically arranged such that when it is the originating node of a call, it has the option to select a predetermined second choice path to advance a call if a predetermined first choice path is unavailable. If, on the other hand, a node happens to be an intermediate node in the path of a call, it does not have the option to select a second choice path if a first choice path to a next node is unavailable. Consequently, if a first choice path is not available at an intermediate node, the originating node tears down the uncompleted connection and makes no attempt to reroute the call over an alternate route.

Thus, in order to avoid establishing circular paths, prior art call routing arrangements typically either restrict a call connection to a predetermined route or to a predetermined choice path. Moreover, it appears that the prior art of call routing makes no attempt to avoid a blocking condition by, for example, allowing an intermediate node to independently select an alternate path around a blocking condition in order to complete a call.

Prior art call routing arrangements have heretofore backed away from allowing a node to independently select the next path in a call connection, since it was believed that unless an intermediate node knew the identity of each prior node in a connection, it could establish a circular path between itself and a previous node. It was also heretofore believed that it would be an onerous task to pass the identity of each node in a connection to a next node as the connection is being established. Consequently, prior call routing arrangements have stuck with some variation of the scheme that predetermines the path of a call.

SUMMARY OF THE INVENTION

In accordance with the invention, circular paths in a path between an originating node and a terminating node are avoided by ensuring that when each node in the path is the current node, it selects a next step, or link, to a next node such that the selected step does not connect to a prior node connected to the current node and that the effect of the advance of the selected step and the advances of individual prior steps which make up a subpath in the path advance the path toward the terminating node. The advance of a step has one of three values in which particular ordered combinations of those values are represented by routing states, and in which each routing state is indicative of the possible advances of the next step. Accordingly, a node need only pass a routing state to the next connected node in the path rather than the actual advance of the selected next step and the advances of prior individual steps.

The three advances respectively represent a forward step, which advances the path toward the terminating node; a null step, which does not advance the path; and a backward step, which does not advance the path but backs it up to a node not yet connected in the path.

BRIEF DESCRIPTION OF THE DRAWINGS

FIG. 2 illustrates a routing state table that may be used in the practice of the invention;

FIG. 3 is an alternate form of the routing state table of FIG. 2;

FIG. 6 illustrates an example of a path selection map that may be stored in the PBX of FIG. 5; and FIG. 7 is a flow chart of a software program which is arranged to carry out the principles of the invention and which may be stored in the PBX of FIG. 5.

DETAILED DESCRIPTION

Figure 1:
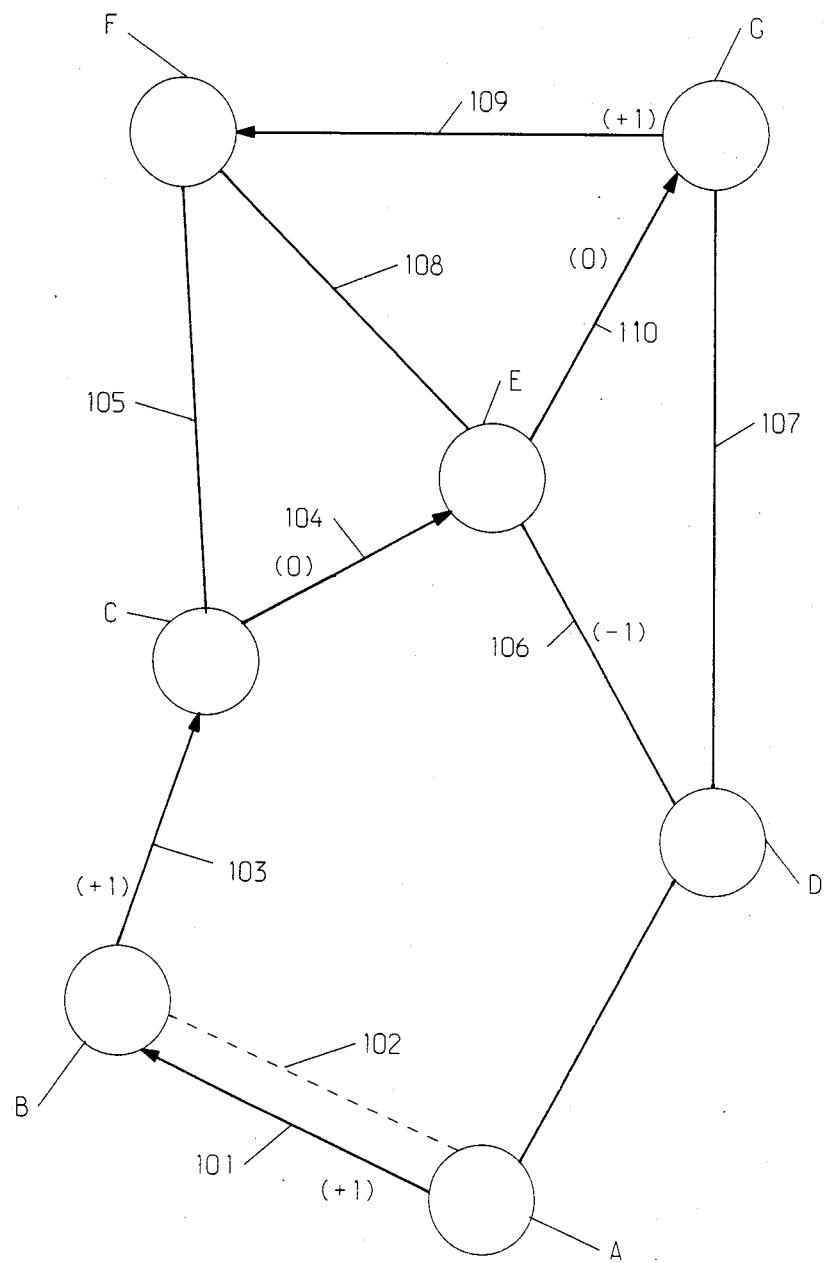
FIG. 1 is a block diagram of a private communication network that is used as an aid in defining terms used hereinafter.

Before discussing the invention, it is desirable at this point to define several terms that are used herein. The following definitions are given with reference to FIG. 1 which shows in schematic form a network comprised of nodes A through G, in which it is assumed that a call originates at node A and terminates at node F over a path that is noted by the direction of the arrows. It should be understood that FIG. 1 is being presented solely to aid the reader in appreciating the definitions of the following terms and is not meant to explain how the invention would actually establish a connection between nodes A and F:

a node is a switching point—for example, a PBX—having the intelligence to make decisions governing the progress of a call connection;

a trunk is a connection between two nodes in the path of the call connection—for example, the trunk which connects node B to node C via subpath (defined below) 103;

a path is the route established by a group of trunks which connect an originating node (node A) to a terminating node (node F) through intermediate nodes (such as nodes B, C, E and G);

a subpath is a contiguous subset of a path—for example, the subpath connecting node B to node E via node C;

a step is the progression of a call over one trunk of its path (i.e., a subpath of length 1)—for example, the step from node E to node G via subpath 110;

the length of a path (subpath) is the number of steps making up the path (subpath)—for example, the length of the path connecting node A (B) to node F (G) is 5 (3);

the distance between two nodes is the minimum path length between the two nodes—for example, the minimum distance between nodes A and F is 3 based, for example, on the three subpaths, or steps, 101, 103 and 105;

the advance of a step connected to a current node in a path is (a) the minimum number of steps that another node connected to the pertinent step is from the terminating node subtracted from (b) the minimum number of steps that the current node is from the terminating node, the advance of each step being shown in parentheses in FIG. 1. For example, the advance of the step from node C to node E via path 104 is 0, since path 104 neither adds to nor shortens the progress of the call, i.e., the distance from node C to node F, via subpath 105, is the same as the distance from node E to node F, via subpath 108. As another example, the advance of the step from node E to node D is −1 (if node D happened to be in the illustrated path to node F), since path 106 increases the path of the call to node F, i.e., the distance from node E to node F is less than the distance from node D to node F. As a further example, the advance of the step from node B to node C is +1, since path 103 progresses the call toward node F, i.e., the distance from node C to node F is less than the distance from node B to node F;

the advance of a path (subpath) is the sum of the advances of all of the steps in that path (subpath)—for example, the advance of the illustrated path from node A to node F is +3 as determined by summing the advance of each step in that path; the advance of the subpath between nodes B and E is +1; and a step which progresses to the same node from which the previous step originated is called a reversal step—for example, a step from node B via subpath 102 back to originating node A.

Specifically, I have recognized, in accordance with the invention, that if the path of a call contains no reversal steps and if all subpaths of at least length 3 have an advance of at least 1 (i.e., the sum of the advances of each of the steps in the subpath is at least 1), then the path is not circular. Moreover, it can be shown that if none of the subpaths which make up the path of a call contain any circular paths, then the path of the call contains no circular paths. It is thus possible to ensure that a path contains no circular paths because a node can avoid selecting a reversal step since it can easily identify (a) the prior node that connects to one of its incoming trunks and (b) a subpath which connects back to the identified prior node. Indeed, all the current node has to do then is to guarantee that when the advance of the next step that it selects to reach the terminating node is added to the advance of the previous two steps and previous three steps, the sum in either case adds up to a positive value of at least 1.

As an example, step 103 of the illustrated connection between nodes A and F of FIG. 1 has an advance of +1, since the distance from node C to node F is one step smaller than the distance from node B to node F, while step 104 has an advance of 0 since the distance from node C to node F is the same as the distance from node E to node F. Node E, when it is connected to the path of the call, guarantees that it does not establish a circular path by selecting a next step to reach node F such that the advance of that selection and the advance of the previous two steps (103 and 104) add up to at least 1. In the example of FIG. 1, node E selects subpath 110, which has an advance of 0, as the next step to reach node F. When an advance of 0 is added to the advances of the two previous steps or to the advances of the three previous steps, the result in either case is still at least 1. Node E thus guarantees, in accordance with the invention, that its selection of a next step does not establish a circular path.

By contrast, if node E was permitted to select step 106 (which has an advance of −1) to reach node F through node D, then a possibility would exist of establishing a circular path, by node D either selecting step 111 as a next step or by node D selecting step 107 to node G and node G selecting step 110 as a next step. The invention, however, precludes this possibility from happening by not allowing node E to select step 106 as a next step, since the advance of the subpath comprising steps 103, 104 and 106 would be less than 1. It is noted that if node E could not select either step 110 or step 108 as a next step because, for example, those steps were not available, then the call would be terminated and an alerting signal, such as reorder tone, would be returned in conventional manner to the calling station (not shown).

The advance of a step can be illustratively one of three values, namely, a +1, −1 or 0, corresponding to a forward step, a backward step or a null step, respectively. The number of possible combinations of the three different advance values for the last three steps of the path of a call is, of course, 3×3×3=27. I refer to the combination of the advances of the last three steps as being the recent path history of the call and I use an ordered triple combination of the advances of the last three steps to represent same. For example, the combination (0, 1, 1) indicates that the second and third previous steps (1, 1) in the path of a call were forward steps and that the most recent step (0) was a null step.

It is easily shown by listing all 27 ordered combinations, or path histories, that only 10 of them result in a total advance of 1 or more, i.e., a positive value. Thus, as long as each node in a call assures that the advance of the subpath of length 3 that terminates at the selected next node has an advance of at least 1, then the current path history can be one of only 10 possibilities. I have recognized that, in accordance with a feature of the invention, individual ones of the 10 current path histories can be formed into groups such that, inter alia, the selection of the same next step for all of the path histories in a first group will cause the current node to pass to the next node one of the path histories in a particular second group. Each group of path histories may, advantageously, be represented by a respective digit, which I call an adaptive routing state digit. The adaptive routing state is therefore representative of N prior steps in the path, in which when the advance of the next selected step and the advances of all but the Nth prior step are arranged in the order of succession of their respective steps in the path, the combination is one of the allowed triple ordered combinations, N being an integer $\geq 3$. Accordingly, as will be discussed below, the invention only requires the current node to pass a single routing state digit to the next node as the path of a call is established, rather than passing the respective current path history.

Referring now to FIG. 2, there is shown Routing State Table 1 in which the aforementioned 10 possible current path histories are grouped into respective routing states. The significance of each routing state is that, as discussed above, the selection of the same next step for each path history in a respective routing state will cause the current node to pass the same next routing state to the next node. In addition, each path history in a given routing state allows the same next step options. For example, both of the two path histories in routing state 0 allow the current node to select any one of the same next-step options 1, $-1$ and 0. If the current node selects a backward step ($-1$), for example, then for either of the path histories in routing state 0, the current node will pass routing state 4 to the next node. The next node then advances the call based on the step options allowed by the routing state it receives.

As mentioned above, preferred embodiments of the invention contemplate passing from node to node the adaptive routing state digit rather than the specific path history, since, as will be discussed below, the specific path history is not essential knowledge for the current node to choose the next step. Knowledge of the current routing state is all that is needed Referring now to FIG. 3, there is shown Routing State Table 2 which identifies the next step options from each routing state as well as what the resulting routing states will be upon selection of a next step. An X in the table indicates that the particular next step is not an option for the associated routing state. The value of a number in the table is what the resulting routing state will be for a particular next step from the associated routing state.

Among the entries in Routing State Table 2 are entries for routing states 0 through 4 arranged in order of increasing restriction in terms of available next step options. For example, routing state 0 allows the advance of the next step to be either $+1$, 0 or $-1$ and the resulting routing states are 0, 2 and 4, respectively; routing states 1 and 2 allow the advance of the next step to be either $+1$ or 0; and routing states 3 and 4 allow the advance of the next step to be $+1$. (Routing states 5, 6 and 7 will be discussed below.)

In the present illustrative implementation of the invention, which will be discussed below, the originating node always assumes a routing state of 0 as its input but passes a new routing state value to the next node. Thereafter, each node, as it is connected to the path, selects a next step according to Table 2 and also passes the new routing state to the next node until finally the terminating node is reached. Each node is advantageously arranged to try to select a forward step as the next step if such is available, since that selection will result in moving the current routing state digit toward routing state 0, which offers the most next step options. Each node is also arranged to select a null step if a forward step is unavailable and to select a backward step if a null step is unavailable, as discussed below.

In routing calls, it may be desirable to change to a different routing scheme based, for example, on a call-specific attribute of the originating station, such as its class-of-service mark. Moreover, it may be desirable to change to a still different routing scheme at a particular node in the progression of a call based on, for example, the level of traffic at that node. In accordance with a feature of the invention, a node at any point in the progression of a call may change from one routing scheme to a different routing scheme.

In particular, Table 2 of FIG. 3 shows routing states 5 and 6 that can be used in a first illustrative routing scheme and shows routing state 7 that can be used in a second illustrative routing scheme.

Illustratively, the class of service of the calling station could be used to determine whether a call is afforded the full flexibility of routing states 0 through 4 or is restricted to the routing scheme embodied in routing states 5 and 6 or to the routing scheme embodied in routing state 7. Such a determination could be made by the originating node. In routing state 5, the next step option is limited to either a forward step or to a null step. In routing state 6, the next step option is limited to a forward step, which causes routing state 6 to adapt to routing state 5. It is seen from Table 2 that routing state 7 limits the progression of a call to a forward step and does not adapt to a more flexible routing state, as does routing state 6.

As mentioned above, the advance of any step in the progression of a call is always either a $+1$, 0 or $-1$. The theoretical basis for this statement can be demonstrated by letting S be any step in the path of a call terminating at, for example, node M, in which S is a step from, for example, node K to node L. If the advance of S is denoted by a(S), and if the distance between nodes is denoted by d(K,M), for example, then by definition:

$$a(S) = d(K,M) - d(L,M) \qquad (1)$$

If P is a path of minimum length from node K to node M and if Q is a path of minimum length from node L to node M, then the length of P is d(K,M) and the length of Q is d(L,M). If step S is prepended to path Q, then the length of this new path is d(L,M) $+1$, since the length of a step, such as S, is 1. Accordingly, the length of path P is either equal to, or less than, this new path, which can be expressed as follows:

$$d(K,M) \leq d(L,M) + 1 \qquad (2)$$

Continuing, if step T, on the other hand, is a reversal step from node L to node K, then the length of the path created by prepending the length of step T to path P is d(K,M) +1, which is either equal to or greater than the length of path Q, which can be expressed as follows:

$$d(L,M) \leq d(K,M)+1 \qquad (3)$$

The results of equations (2) and (3) can be substituted for the terms shown in equation (1) to establish the bounds of step S as follows:

$$-1 \leq d(K,M)-d(L,M) \leq 1 \qquad (4)$$

or $$-1 \leq a(S) \leq 1 \qquad (5)$$

Accordingly, from equation 5, the advance of a step is a value between $-1$ and $+1$, namely $+1$, 0, or $-1$.

As mentioned above, in accordance with the principles of my invention, if the path of a call contains no reversal steps and if all subpaths of length 3 or more have an advance of at least 1 then the path is not circular. The theoretical basis for this statement can be proven by proving its contrapositive, i.e., that if the path of a call is circular and contains no reversal steps then it contains a subpath of length 3 or more with an advance of less than 1.

In particular, if a path is circular, it contains a subpath—for example, a subpath designated P—which begins and ends at the same node and which has an advance of 0. The length of P cannot be 1 and it cannot be 2, since subpath P would then contain a reversal step. Since it is assumed that subpath P contains no reversal step, its length has to be 3 or greater, Q. E. D.

The above concepts can now be extended to include longer subpaths, i.e., if all subpaths of length 3 or 4 of a call path have an advance of at least 1, then any longer subpath will also have an advance of at least 1. For example, if subpath P is of length 5 and comprises the step S1, S2, S3, S4 and S5 in which the advance of the steps are a(S1), a(S2), a(S3), a(S4) and a(S5), respectively, subpath P can be divided into at least two smaller subpaths of length 3, each having an advance of at least 1, as follows:

$$a(S1)+a(S2)+a(S3) \geq 1 \qquad (6)$$

and $$a(S3)+a(S4)+a(S5) \geq 1 \qquad (7)$$

The advance of subpath P can now be shown to be at least 1 by summing equations (6) and (7) as follows:

$$a(S1)+a(S2)+a(S3)+a(S4)+a(S5) \geq 2-a(S3) \geq 1 \qquad (8)$$

Any subpath of length greater than 5 can be subdivided into disjoint subpaths of length 3 or 4. Also, since the advance of these smaller subpaths is at least 1, then the advance of the larger subpath (being the sum of the smaller subpaths) must also be at least 1.

Figure 4:
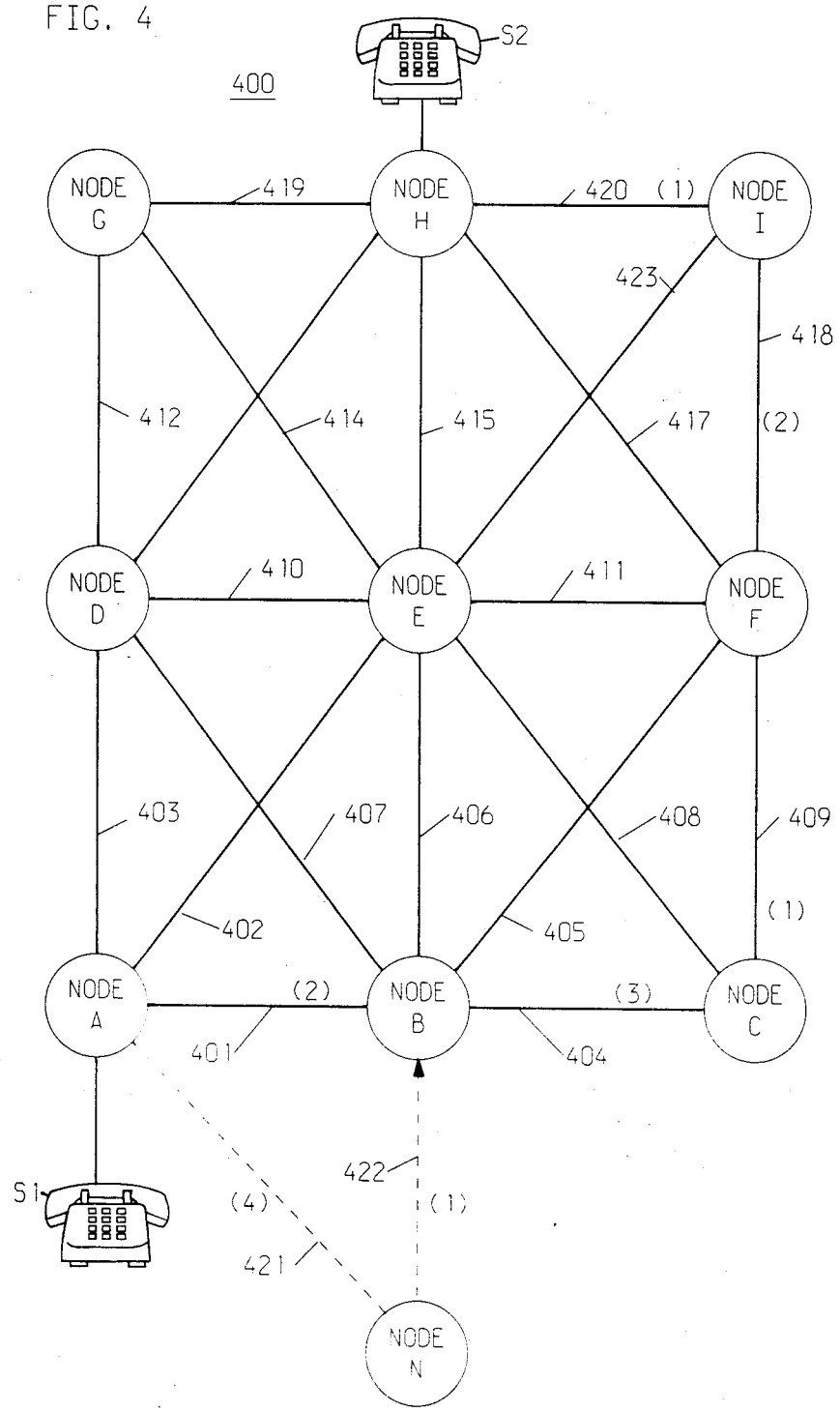
FIG. 4 is a block diagram of a private communication system that is used to illustrate the principles of the invention.

The invention is illustrated herein in the context of a PBX network. In particular, FIG. 4 illustrates in schematic form a private network of interconnected PBX's, operating as switching nodes, which are arranged in accordance with the principles of the invention to establish a call, or communication, path between a calling station set, for example, station set S1, and a called station, for example, station set S2 over alternate routes. Each alternate route includes one or more subpaths in which a call may be alternately routed from an originating node over a first subpath to an intermediate node, and thence over subsequent subpaths to a terminating node. It is understood of course that each switching node actually serves a plurality of station sets and that each node may connect to a central office over central office lines (not shown).

Each node A through I in network 400 is connected to other network nodes as shown by respectives ones of subpaths 401 through 420. Also, each subpath of length 1, or step, 401 through 420 represents a group of communication paths, for example, communication lines, which connect illustratively bidirectional trunks forming a trunk group in one node to respective bidirectional trunks forming a trunk group in another node. Such trunks typically employ a common signaling arrangement, such as E&M signaling, to establish a communication path between two nodes. When a communication path has been established between two nodes, for example, between nodes A and B, the latter will signal the former to supply the particulars associated with a call, such as the called telephone number.

In the ensuing discussion, it is assumed that each node is arranged in accordance with the principles of the invention to also (a) select the next step in the progression of a call as a function of the value of the routing state digit it receives from the previous node and (b) supply the routing state digit (shown in parentheses) to the next node. The selection of the next step in the progression of a call is facilitated at each node by using what I call a path selection map, which will be explained below in detail. Presently, it suffices to say that a path selection map exists for each node A through I and identifies, inter alia, the forward, null and backward steps (if available) that the current node may select to reach another node in the network when the latter is identified as being the destination node.

In the following discussion of establishing a path between station set S1 (the calling station) and station set S2 (the called station) using the principles of the invention, it is assumed that nodes D and E and step 405 are out of service. Moreover, node N and steps 421 and 422 are not considered to be part of network 400 at this point, but will be discussed below as an aside in connection with selecting a backward step as an alternate route.

Station set S1 establishes a communication path between itself and node A by going off-hook. Node A recognizes the off-hook as a resquest for service by station set S1 and prepares to receive (illustratively) multifrequency dialing information from station set S1, such as the telephone number of station set S2. As is conventional, the telephone number comprises a plurality of digits in which illustratively the first two or three digits represent the office, or exchange, code of the destination node and in which the remaining digits represent the code, or extension number, of the called station set connected to the destination node. Accordingly, node A, upon receiving the telephone number of station set S2 from station set S1 and upon identifying node H as being the terminating node, prepares to select a step to that node.

In accordance with a feature of the invention, since node A is the originating node in the path of the call between station sets S1 and S2, it assumes that the value of the routing state digit is 0 and selects a next step in accordance with that value. In this example, node A would normally first select either step 402 or step 403 as a next step since, as it can be shown, those paths represent forward steps toward node H. But, because nodes D and E are out of service, node A selects alternate null step 401 to node B and passes to node B routing state 2 and, as mentioned above, the called telephone number. If step 401 were not available, the progression of the call would stop at node A and an alerting signal, such as reorder tone, would be returned to station S1 in conventional fashion.

(As an aside, if node N happened to be connected to network 400 as shown, step 421 would constitute a backward step from node A to reach node H. If step 401 were not available, then node A would select step 421 as a next step and would pass routing state 4 to node N. In this instance, node A would adapt the routing state digit to reflect the advance of step 421 and would pass the digit to node N. A forward step is the only next step available to routing state 4, as seen from Table 2. Accordingly, node N would select step 422 as the next step, since it constitutes a forward step to node H, and would pass routing state digit 3 to node B.)

Continuing, and with reference to Table 2, the path options available to node B based on its receipt of routing state 2 from the prior node A are either a forward step or a null step. A forward step is preferred and, indeed, steps 405 through 407 all constitute forward steps to node H. Because nodes D and E are out of service, however, and because step 405 is unavailable, node B cannot take a forward step as a next step option. Steps 401 and 404 constitute null steps, which are preferred if no forward steps are available. However, in accordance with the invention, node B avoids selecting step 401 as a next step since that step constitutes a reversal step to node A. Accordingly, node B selects null step 404 as the next step to reach node H.

The path options available to node C, having received routing state 3, are only forward steps. Step 408 and step 409 constitute the only forward steps to node H from node C. Since step 408 connects to an unavailable node (node E), node C selects step 409.

The routing state options available to node F based on its receiving routing state 1 from node C are, once again, a forward step and a null step. Step 417 constitutes a forward step whereas steps 411 and 418 constitute null steps to node H. Step 405 constitutes a backward step to node H from node F, but, as noted above, that step option is not available to routing state 2.

If it is assumed that the forward step provided by step 417 is unavailable because, for example, of an all-trunks-busy condition to that path, node F would then select a null step, i.e., step 418, as a next step to node H. Accordingly, node F adapts the current routing state to reflect the advance of the next step it has selected and passes the new routing state to node I.

Of the next path options available to node I based on receiving routing state 2, node I selects a forward step to node H as the next step option, assuming that step 420 is available. In the event that step 420 is not available, the call cannot progress. Specifically, node I cannot select null step 423 to node E since node E is not available. Moreover, node I cannot select step 418 since that step constitutes a reversal step. In this event, as mentioned above, reorder tone is returned to station S1 in conventional fashion.

Assuming that step 420 is available, however, the selection of that forward step by node I causes routing state 2 to adapt to routing state 1 which is passed to node H. However, since node H is the terminating node, it ignores the routing state digit and completes the path of the call to station set S2.

Figure 5:
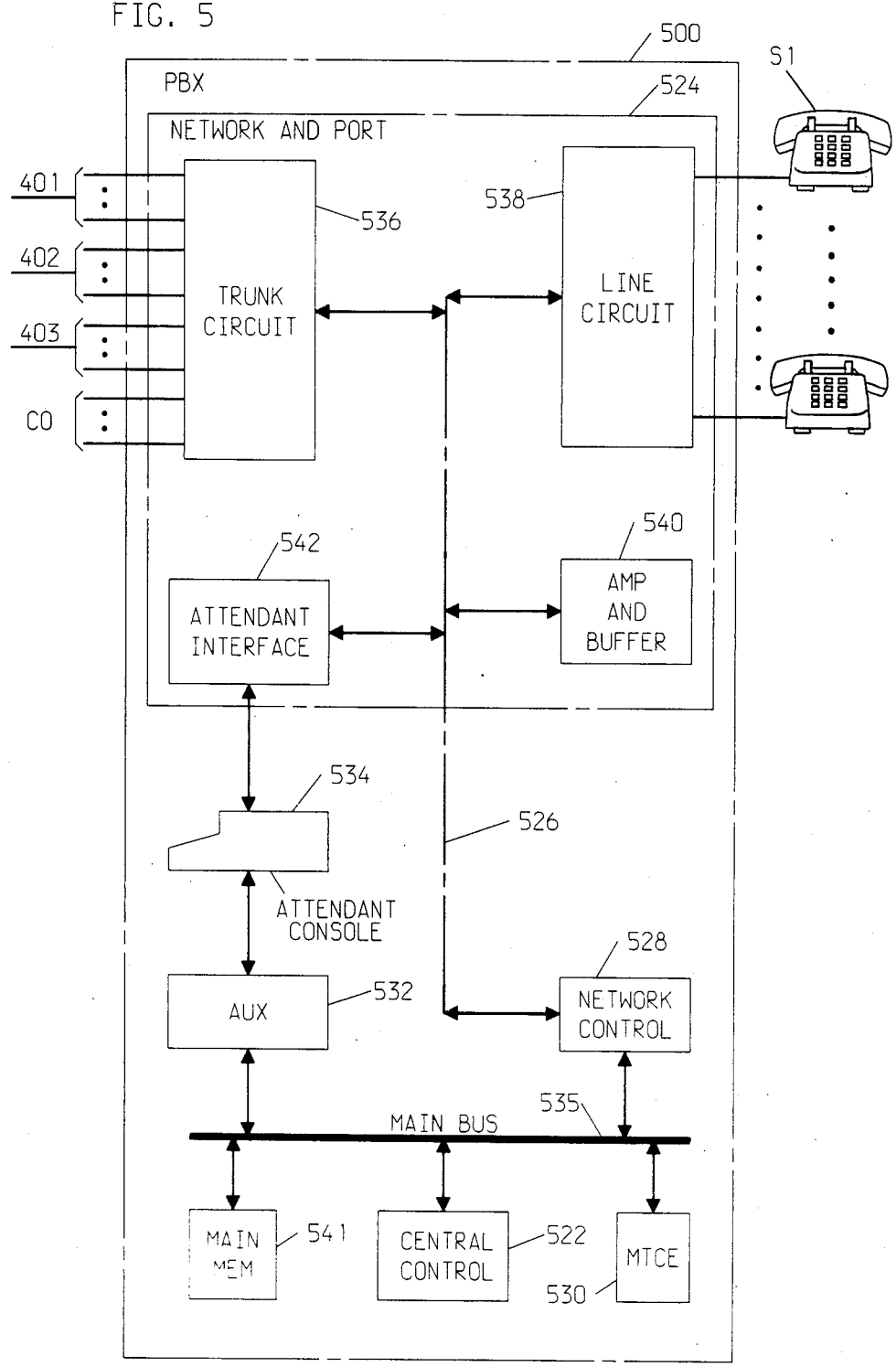
FIG. 5 is a block diagram of a PBX which can be arranged to embody the principles of the invention and which can also be used in the network system of FIG. 4.

Turning now to FIG. 5, there is shown a block diagram of PBX 500 which can serve as a switching node, for example, node B of FIG. 4 and which can be suitably programmed to effect the principles of the invention.

PBX 500 is arranged to establish a connection from a station set connected to it, such as station S, to a station set connected to another PBX over either the public telephone network or over a private telephone network, such as the private telephone network of FIG. 4. For example, PBX 500 can be connected to the public telephone network via trunk leads C0 and can be interconnected to a private network via paths, or trunk leads, 401 and 404 through 407. PBX 500 can be, for example, of the type disclosed in U.S. Pat. No. 4,090,237 issued on May 16, 1978 to J. O. Dimmick. A general description of the software used in this type of PBX is described in "The Dimension PBX: Software," by C. Chao et al, National Telecommunications Conference, December, 1975.

In particular, PBX 500 comprises central control 522 and network and port circuits 524. PBX 500 further comprises network time division multiplexed bus 526, network control 528, maintenance circuit 530, auxiliary circuit 532 and attendant console 534. In addition, PBX 500 comprises main bus 535 for interconnecting central control 522, network control 528, maintenance circuit 530, auxiliary circuit 532 and main memory 541.

Central control 522 controls PBX 500 by executing program instructions which are part of an executive program stored in main memory 541. Under the direction of the executive program, central control 522 processes calls by (a) periodically interrogating the status of network and port circuits 524, (b) detecting and interpreting changes in the status of network and port circuits, and (c) issuing commands to the network and port circuits 524 to advance a call to its next logical state.

Network and port circuits 524 include trunk circuits 536, line circuits 538, amplifier and buffer circuit 540 and attendant console interface circuit 542. Network and port circuits 524 facilitate (a) the connection of PBX 500 to the public telephone network via trunks C0 and to a private network, such as network 400, via trunks 401 and 404 through 407, (b) the provision of on-hook/off-hook status to network control circuit 528, (c) the reception of commands from central control 522 to initiate a change of state of a particular one of the network and port circuits 524, (d) the reception of, inter alia, the called telephone number from a station set connected to one of the line circuits 538, (e) the reception of signals indicative of, for example, a routing state digit from a PBX, or node, connected to one of the trunk circuits 536, and (f) the transmission of signals indicative of, for example, a new routing state digit and called telephone number to a next PBX connected to another one of the trunk circuits 536.

Network control circuit 528 is adapted to sense the status of network and port circuits 536 and 538 in order to determine the status of a station set, such as station S and the status of a trunk connected to PBX 500 via one of the paths 401, 404 through 407 or one of the C0 paths.

The executive control program contained within memory 541 is adapted to monitor the operation of PBX 500 and to periodically invoke a task matrix. A task dispenser program, which receives control from the executive control program, schedules the execution of tasks according to the task matrix generated by the executive control program. Such tasks includes programs which are adapted to establish a connection between a station set, such as station S, and one of the paths 401, 404 through 407 or C0 lines. PBX 500 can be programmed, as mentioned above, to establish such connections in accordance with the invention, as discussed below.

Referring now to FIG. 6, there is shown an example of a path selection map 600 that exists for, illustratively, node B of network 400. The path selection map of FIG. 6 can be stored in memory, such as memory 541 of FIG. 5.

Map 600 comprises a line of entries for each node in network 400, except for node B. The line entries for each such node include (a) a status bit (S) for that node, that bit being set to a 1 (0) when the associated node is in (out of) service, (b) the possible steps to that node from node B, (c) a status bit for each such step, which is likewise set to a 1 when the step is in service and to 0 when the step is either out of service or unavailable, the latter case occurring when the step is blocked due to, for example, a high level of traffic, and (d) the advance of each step, which is shown as a signed decimal number.

For example, if node H is the destination node, then node B can select one of five steps as a next step to reach that node, namely steps 405, 406, 407, 401 or 404, based on the value of the routing state digit it receives.

It is seen from FIG. 6 that each of steps 405, 406 and 407 constitutes a forward step as indicated by its respective advance bit and each is either blocked or out of service as indicated by its respective status bit.

Continuing, steps 401 and 404 are shown to be unblocked null steps to node H, either of which may be selected by node B to reach node H if allowed by the value of the routing state digit. It is mentioned again that node B would not select step 401 if node A happens to be the originating node, since that selection would constitute a reversal step. (It is noted that if node N were a node in network 400, then step 422 would be listed in map 600 as a null step to node A from node B.)

When a node, for example, PBX 500, receives the called telephone number and routing state digit from a previous node, it invokes the routing logic program shown in FIG. 7 to advance the call after it determines that it is not the destination node. The program illustrated in FIG. 7 may be stored in main memory 541 of PBX 500 and entered in the task matrix so that it can be invoked by the task dispenser to select the next step in the path of a call.

Program 700 entered at block 701 identifies the destination node from the office code of the called telephone number. At block 702, the program determines if it is the originating node. If it is, it sets the routing state digit to 0 at block 703 and proceeds to block 704. Otherwise, the program proceeds to block 704 without changing the routing state digit.

At block 704, program 700 indexes its path selection map using a value formed from the office code of the called telephone number to select a forward step as the next step to reach the destination node identified at block 701. If such a step is available, as determined at block 705, the program proceeds to block 713 to establish a connection to the node connected to the selected step.

If a forward step is not available, program 700 proceeds to block 706 where it transfers, or branches, to block 709 if the routing state digit happens to be a 3 or 4 or to block 707 if it happens to be a 0, 1 or 2. At block 709, reorder tone is returned to the calling station as an indication that a path to the called station is not available.

At block 707, program 700 selects a null step as an alternate next step to reach the destination node. If a null step is available, as determined at block 708, the program proceeds to block 713. If a null step is not available, program 700 proceeds to block 710 where it branches out based on the value of the current routing state digit. If the routing state digit happens to be a 1 or 2, then reorder tone is returned to the calling station, as discussed above. If the routing state digit happens to be a 0, then the program proceeds to block 711 to select a backward step as the next step.

At block 712, program 700 determines whether a backward step is available. If such a step is available, the program proceeds to block 713. If a backward step is not available, the program then proceeds to block 709.

At block 714, program 700 adapts the routing state digit to reflect the advance of the selected next step by indexing Table 2, which may be stored in main memory 541, using the value of the current routing state digit and the advance of the selected next step.

At block 715, the called telephone number and new routing state digit are supplied to the next node, after which the program exits via block 716.

Although a specific embodiment of this invention has been shown and described, it will be understood that various modification may be made without departing from the spirit of this invention. For example, my invention may be adapted to any network in which there is a need to establish a path from an originating point to a terminating point, such as in the public switched network. Also, in certain situations it may be advantageous to select a null step or a backward step over a forward step.

What is claimed is:

1. An arrangement for use in a network comprised of a plurality of nodes interconnected by a plurality of steps, said arrangement being adapted for selecting at a current node in a path between an originating node and a terminating node a next step to a next node, comprising means for storing at least one advance for each of said steps connected to said current node, each of said nodes being a predetermined number of steps from said terminating node, the advance for each one of said steps connected to said current node being (a) the minimum number of steps that another node connected to said each one of said steps is from said terminating node subtracted from (b) the minimum number of steps that said current node is from said terminating node, means for receiving a routing state from a prior node in said path connected to said current node, said routing state being indicative of the advances of N prior individual ones of said steps in said path, N being a predetermined integer $\geq 3$, and means for selecting as said next step an individual one of said steps connected to said current node which does not connect to said prior node and which has an advance (a) whose sum with the advances of said N prior individual ones of said steps is positive and (b) whose sum with the advances of all but the Nth prior one of said individual ones of said steps is positive.

2. The invention set forth in claim 1 wherein each said advance has one of three values and said received routing state is one of a predetermined plurality of routing states, each of said plurality of routing states representing at least one particular ordered combination of said three advance values and wherein the advances comprising the advance of said next step and the advances of said all but the Nth prior one of said individual ones of said steps, arranged in the order of succession of their respective steps in said path, is one of said combinations.

3. The invention set forth in claim 1 further comprising means for adapting the received routing state to an individual one of said plurality of routing states as a function of said received routing state and the advance of said next step and for passing said individual one of said plurality of routing states to said next node.

4. An arrangement for use in a network comprised of a plurality of nodes interconnected by a plurality of steps, said arrangement being adapted for selecting at a current node in a path between an originating node and a terminating node a next step to a next node, comprising means for storing at least one advance for each one of said steps that is connected to said current node, said advance having one of a plurality of values and each of said nodes being a predetermined number of steps from said terminating node, the advance for each one of said steps connected to said current node being the difference between (a) the minimum number of steps that said current node is from said terminating node and (b) the minimum number of steps that another node connected to said each one of said steps is from said terminating node, means for receiving one of a plurality of routing states from a prior node in said path connected to said current node, each of said plurality of routing states representing a group of predetermined allowed combinations of said advance values, said one of said plurality of routing states being indicative of the advances of N prior individual ones of said steps in said path, said N prior individual ones of said steps being a subpath in said path and the advances of said steps in each subpath in said path, arranged in the order of succession of their respective steps in said each subpath, is one of said allowed combinations, N being an integer ≧3, and means for selecting as said next step one of the steps connected to said current node such that said next step does not connect to said prior node and the advances comprising the advance of said next step and the advances of all but the Nth prior one of said individual ones of said steps, arranged in the order of succession of their respective steps in said path, is one of said allowed combinations.

5. The invention set forth in claim 4 further comprising means for adapting said received routing state to an individual one of said plurality of routing states as a function of said received routing state and the advance of said next step and for passing said individual one of said plurality of routing states to said next node.

6. The invention set forth in claim 4 wherein the sum of the advances in each of said allowed combinations is a positive value.

7. An arrangement for use in a telephone network comprised of a plurality of nodes interconnected by a plurality of steps, said arrangement being adapted for use at a current node in a path between an originating node and a terminating node, comprising means for storing an advance for each of said steps that is connected to said current node, each of said nodes being a predetermined number of steps from said terminating node, the advance for said each one of said steps being (a) the minimum number of steps that another node connected to said each one of said steps is from said terminating node subtracted from (b) the minimum number of steps that said current node is from said terminating node, means for receiving a routing state from a prior node in said path connected to said current node, said advance having one of three values and said routing state being indicative of allowed advances of a next step in said path, and means for selecting as said next step an individual one of said steps connected to said current node such that said next step does not connect to said prior node and such that the advance of said next step is an advance allowed by said received routing state.

8. The invention set forth in claim 7 wherein said received routing state is one of a predetermined plurality of routing states, said received routing state being further indicative of the advance of N prior individual ones of said steps in said path and each of said plurality of routing states representing at least one of a plurality of ordered combinations of said three advance values and wherein the advances comprising the advance of said next step and the advances of all but the Nth prior one of said individual ones of said steps, arranged in the order of succession of their respective steps in said path, is one of said ordered combinations, N being a predetermined integer ≧3.

9. The invention set forth in claim 8 further comprising means for adapting said received routing state to an individual one of said plurality of routing states as a function of said received routing state and the advance of said next step and for passing said individual one of said plurality of routing states to said next node.

10. The invention set forth in claim 8 wherein the sum of the advances in each of said predetermined combinations is a positive value.

11. The invention set forth in claim 7 wherein said originating node connects to a calling station, said invention further comprising means for adapting said received routing state to one of another plurality of routing states based on a class-of-service mark associated with said calling station.

* * * * *